(12) United States Patent
Osborn et al.

(10) Patent No.: US 6,347,678 B1
(45) Date of Patent: Feb. 19, 2002

(54) MODULAR FUEL TANK ASSEMBLY, VEHICLE MOUNTING ARRANGEMENT AND METHOD FOR INSTALLATION

(75) Inventors: Thomas J. Osborn; Roger W. Byers; Harold H. Hayes; James P. Manning; Michael C. DePoy, all of Fort Wayne; John M. Ammer, New Haven; Jeffery D. Jenks; Nathan L. Schuler, both of Fort Wayne; Estle V. Townsend, Jr., Decatur; Robert G. Beineke, Fort Wayne, all of IN (US)

(73) Assignee: Navistar International Transportation Company, Warrenville, IL (US)

( * ) Notice: Subject to any disclaimer, the term of this patent is extended or adjusted under 35 U.S.C. 154(b) by 0 days.

(21) Appl. No.: 09/418,109

(22) Filed: Oct. 14, 1999

Related U.S. Application Data

(63) Continuation-in-part of application No. 08/974,769, filed on Nov. 20, 1997, now Pat. No. 6,053,533.

(51) Int. Cl.⁷ .......................... B60R 16/04; B60R 9/048
(52) U.S. Cl. .................... 180/68.5; 280/163; 280/164.1
(58) Field of Search .............................. 280/161, 164.1, 280/163, 769; 180/68.5; 296/37.1, 37.6; 248/201, 311.2, 309.1

(56) References Cited

U.S. PATENT DOCUMENTS

| | | | | |
|---|---|---|---|---|
| 2,902,240 A | * | 9/1959 | Belle | ........................... 248/201 |
| 3,903,981 A | * | 9/1975 | Peterson | ..................... 180/68.5 |
| 4,013,300 A | * | 3/1977 | Berger | ....................... 180/68.5 |
| 4,042,201 A | * | 8/1977 | O'Callaghan | ............ 248/311.2 |
| 4,074,786 A | * | 2/1978 | Joubert | ....................... 180/68.5 |
| 4,836,568 A | * | 6/1989 | Preslik et al. | ............... 180/68.5 |
| 4,925,235 A | | 5/1990 | Fingerle | |
| 5,593,167 A | * | 1/1997 | Barnhardt et al. | ......... 180/68.5 |

OTHER PUBLICATIONS

Navistar's 1997 Sales Data Book for 1000 Series Stripped Chassis, PDB–23000U, Jul., 1996 Edition.

* cited by examiner

Primary Examiner—Lanna Mai
Assistant Examiner—Jeffrey J. Restifo
(74) Attorney, Agent, or Firm—Jeffrey P. Calfa; Dennis Kelly Sullivan; Neil T. Powell

(57) ABSTRACT

A mounting arrangement for a modular component such as a fuel tank for a vehicle such as a truck and a method of installing same on the vehicle. The method is accomplished via a combination of a set or sets of two brackets and an initial alignment means for each set of brackets. The initial alignment means is comprised of two mating components, with one mating component being a portion of one bracket and the other mating component being a portion of the second bracket. One bracket of each set is installed directly to a portion of the vehicle under manufacture, such as to the frame rail. A modular assembly is assembled separately with the second bracket of each set installed on the modular assembly. The sets of brackets are joined via the initial alignment means attaching the modular assembly to the vehicle. Final attachment may then be made between the set or sets of two brackets and hence the modular assembly and the vehicle, while the modular assembly is held into proper position via the initial alignment means. This attachment method may be used on a battery box assembly both with and without an attached air tank.

15 Claims, 12 Drawing Sheets

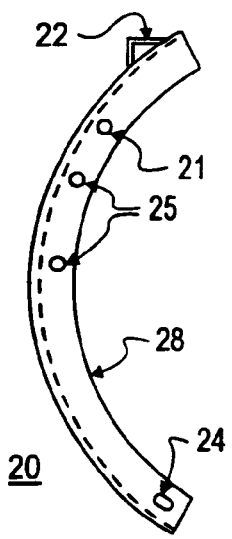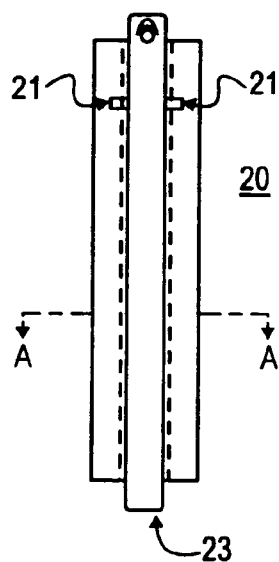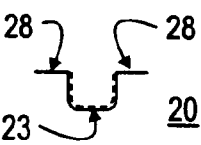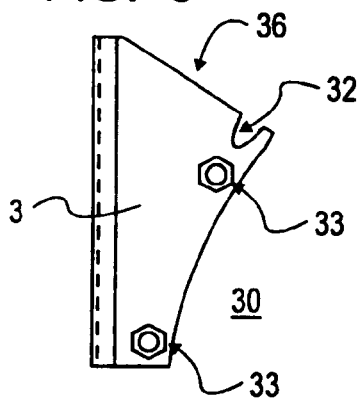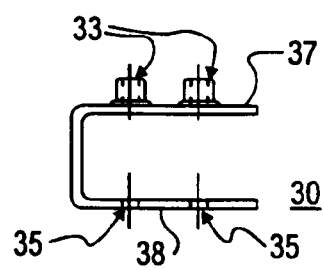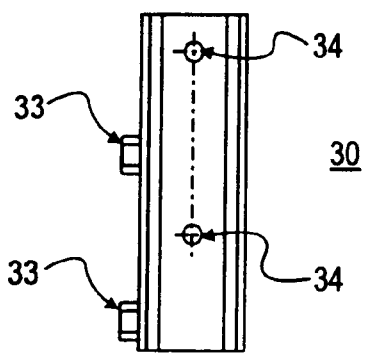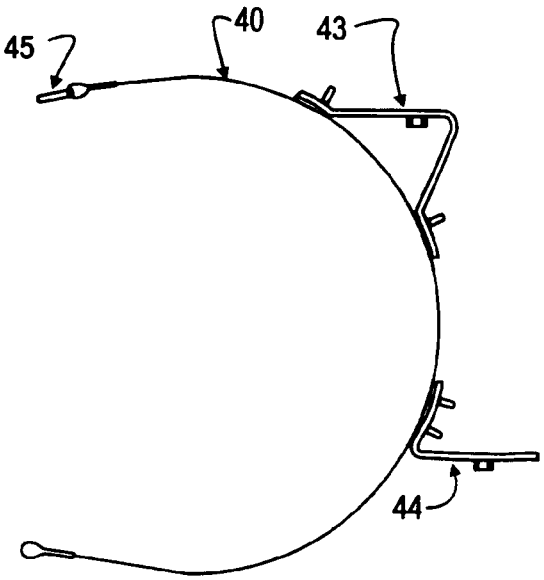

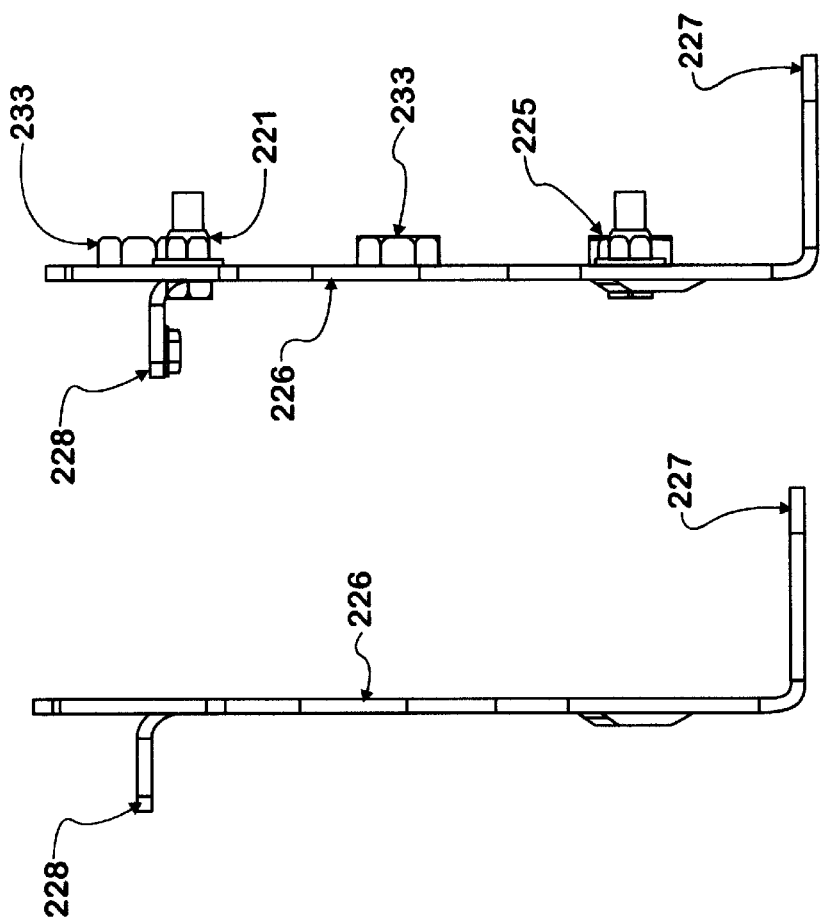
FIG. 22
FIG. 21
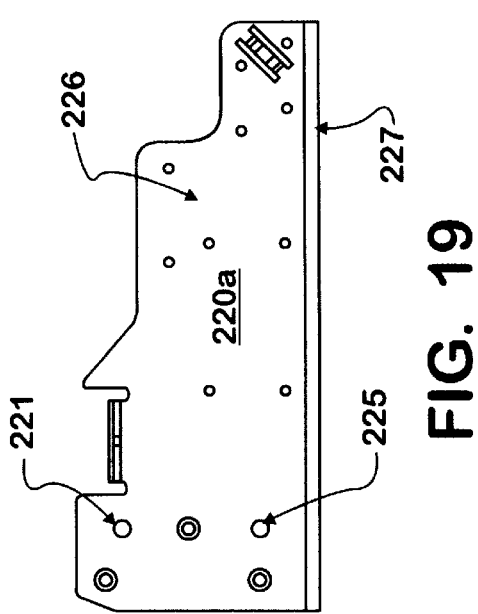
FIG. 19
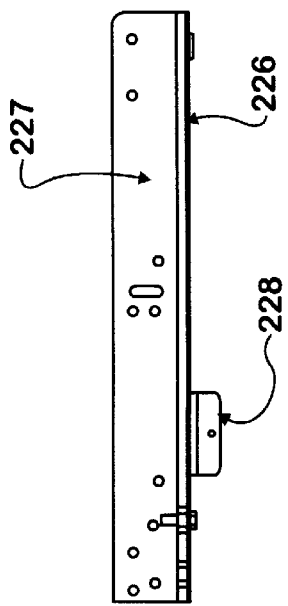
FIG. 20

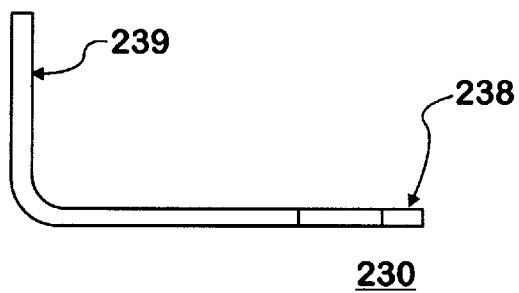
FIG. 25
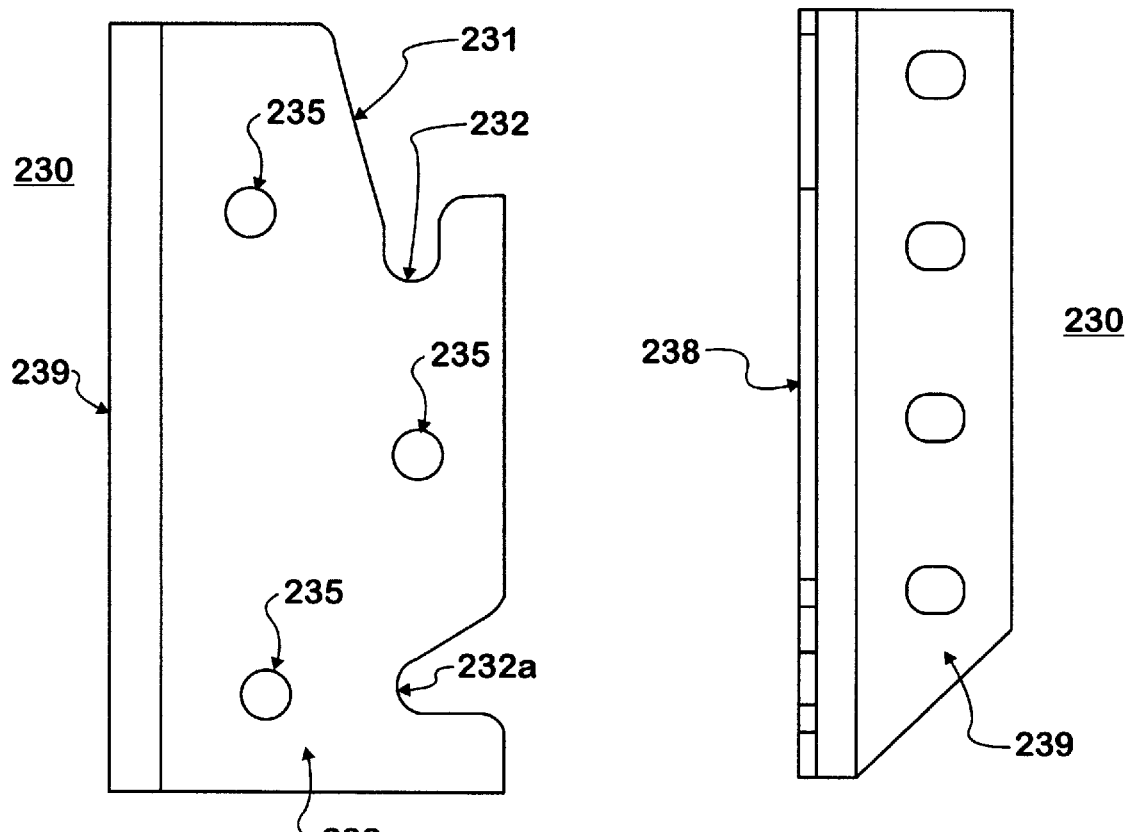
FIG. 23
FIG. 24

(12)	United States Patent	US 6,347,678 B1

MODULAR FUEL TANK ASSEMBLY, VEHICLE MOUNTING ARRANGEMENT AND METHOD FOR INSTALLATION

This is a continuation-In-Part of application Ser. No. 08/974,769, filed Nov. 20, 1997 now U.S. Pat. No. 6,053,533.

BACKGROUND OF THE INVENTION

The present invention relates to a modular fuel tank and mounting arrangement for a vehicle such as a truck or a bus and a method of installing same on the vehicle. More specifically, the design of the mounting arrangement allows the fuel tank and entry/egress steps to be sub-assembled off of a main assembly line and brought to the main assembly line as a unit for installation with little or no alignment required. The mounting arrangement may be applied to other modular assemblies for vehicles such as battery boxes and air tanks.

THE PRIOR ART

Heretofore, components such as fuel tanks on trucks and buses were installed via a time consuming and man power intensive process on the main assembly for the vehicle. As each vehicle was moved into the fuel tank installation portion of the assembly line, a hanger bracket was bolted to the frame rail. This hanger bracket was shaped semi-circular or 'L' shaped to receive a round or 'D' shaped tank respectively. Line personnel physically moved the fuel tank up to the hanger bracket and while holding the tank against the bracket, wrapped tank straps with linking bolts around the tank. Each tank strap was fastened at one end with bolting through the frame rail side member and the other end with bolting to the hanger bracket. The process was cumbersome due to the bulky nature of the fuel tank. Time was required to align the fuel tank so that access points such as the filling point were properly situated. Fuel tank mounted entry/egress steps could only be installed after tank installation on the vehicle.

SUMMARY OF THE INVENTION

Accordingly, a primary object of the apparatus and method of the present invention is to provide the vehicle with a fuel tank assembly with a mounting means which allows the fuel tank and entry/egress steps to be sub-assembled off of the main vehicle assembly line, brought to the main assembly line as a unit, and installed with little or no alignment effort required on the main assembly line.

The method of achieving this type of installation is accomplished via a combination of a set or sets of two brackets and an initial alignment means for each set of two brackets. The initial alignment means is comprised of two mating components, with one mating component being a portion of one bracket and the other mating component being a portion of the second bracket. One bracket of each set is installed directly to a portion of the vehicle under manufacture, such as to the frame rail. A modular assembly, in the case described in detail below a fuel tank assembly, is assembled separately with the second bracket of the set installed on the modular assembly. The modular assembly is moved to the main assembly line where the sets of brackets are joined via the initial alignment means. The initial alignment means allows the modular assembly to be temporarily attached to the vehicle with little or no alignment effort. Final attachment may then be made between the set or sets of two brackets and hence the modular assembly and the vehicle, while the modular assembly is held into proper position via the initial alignment means. One or more set or sets of brackets will be needed depending on the geometry and size of the modular assembly to be installed.

BRIEF DESCRIPTION OF THE DRAWINGS

Other objects and advantages of the invention will become more apparent upon perusal of the detailed description thereof and upon inspection of the drawings in which:

FIG. 5 is a side view of a tank bracket of the fuel tank assembly of FIG. 1.

FIG. 6 is a back view of the tank bracket of FIG. 5.

FIG. 7 is a cross sectional view of the tank bracket at line A—A of FIG. 6.

FIG. 8 is a side view of a rail bracket of the fuel tank assembly of FIG. 1.

FIG. 9 is a bottom view of the rail bracket of FIG. 8.

FIG. 10 is a back view of the rail bracket of FIG. 8.

FIG. 11 is a side view of a tank strap with entry/egress steps installed of the fuel assembly of FIG. 1.

FIG. 19 is a side view of the combination structural rib and box bracket of FIG. 17.

FIG. 20 is a top view of the combination structural rib and box bracket of FIG. 17.

FIG. 21 is a front view of the combination structural rib and box bracket of FIG. 17.

FIG. 22 is front cutaway view of the combination structural rib and box bracket of FIG. 17 assembled.

FIG. 23 is a side view of the rail bracket of FIG. 18.

FIG. 24 is front view of the rail bracket of FIG. 18.

FIG. 25 is a top view rail bracket of FIG. 18.

DESCRIPTION OF THE PREFERRED EMBODIMENT

Figure 1:
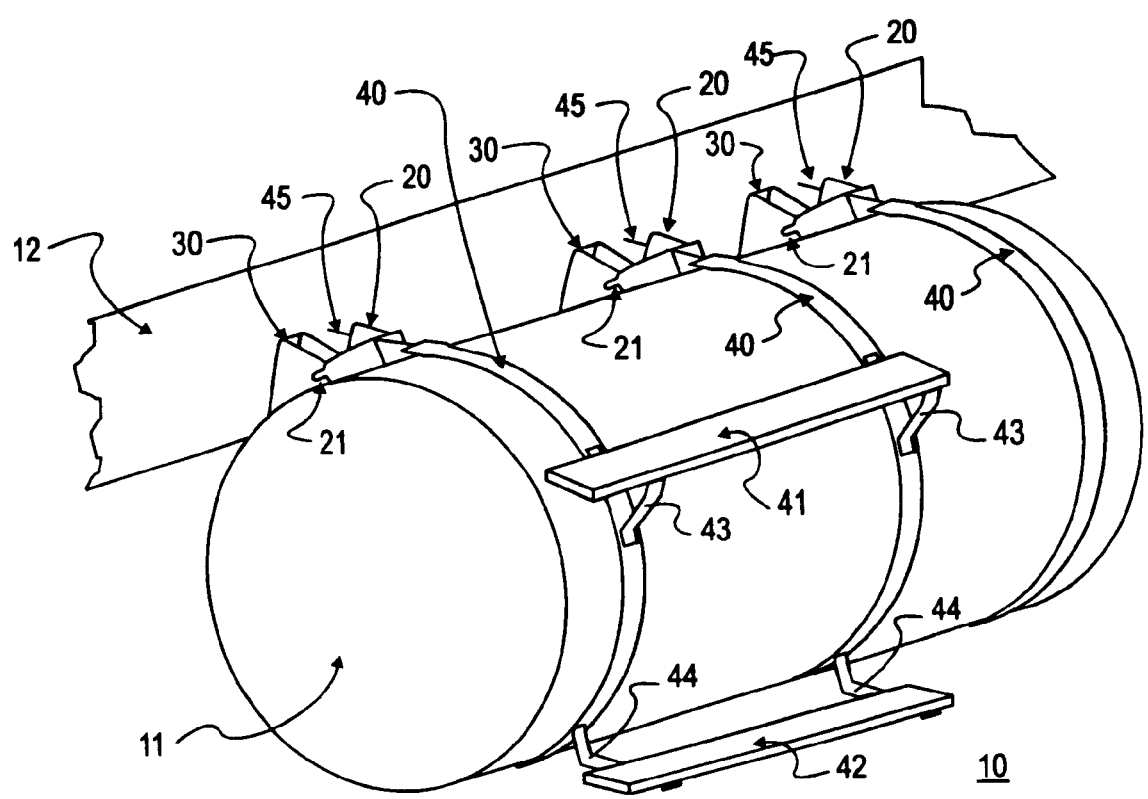
FIG. 1 is a perspective view of the fuel tank assembly of the present invention installed to a frame rail of a vehicle using a cylindrical tank.
Figure 3:
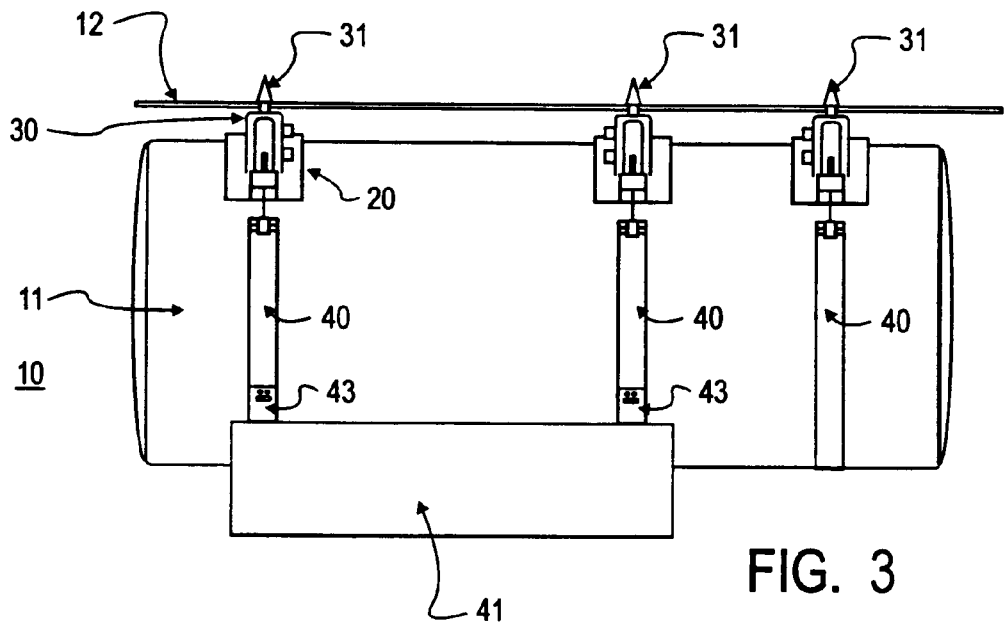
FIG. 3 is a top view of the fuel tank assembly of FIG. 1.
Figure 4:
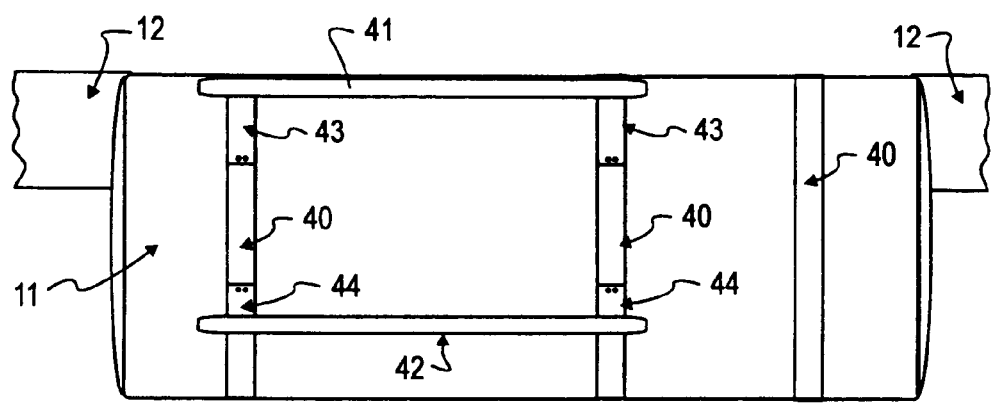
FIG. 4 is a side view of the fuel tank assembly of FIG. 1.
Figure 2:
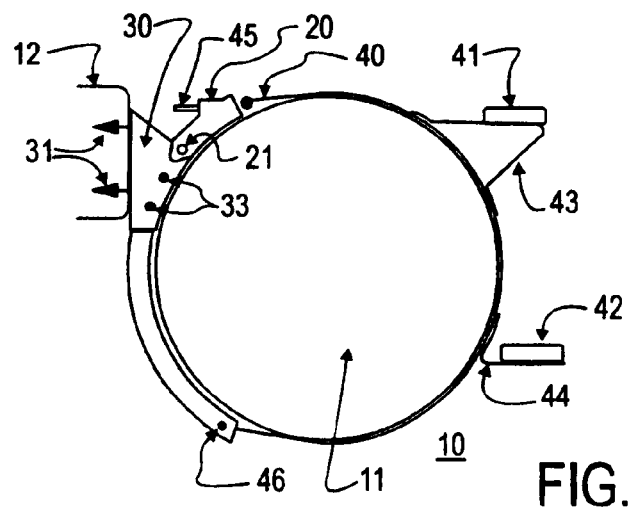
FIG. 2 is a front view of the fuel tank assembly of FIG. 1.

Referring now to the drawings in greater detail there is illustrated in FIG. 1 a fuel tank assembly 10 installed to a frame rail 12 of a vehicle 101 (not shown) made in accordance with the teachings of the present invention.

The fuel tank assembly 10 is generally comprised of four types of main components: a fuel tank 11; at least two tank brackets 20; at least two rail brackets 30; and at least two tank straps 40. FIGS. 1–4 show an embodiment of the invention with three tank brackets 20, three rail brackets 30 and three tank straps 40. Each tank bracket 20 is combined with a tank strap 40, as will be described in more detail below, to encircle the fuel tank 11. The rail brackets 30 are installed to the frame rail 12 of the vehicle 101. The fuel tank 11 with the tank brackets 20 and tank straps 40 installed is moved up so that the tank brackets 20 meet up with the rail brackets 30. At this point the tank brackets 20 and rail brackets 30 are final bolted up together.

The fuel tank 11 is cylindrically shaped as shown in FIGS. 1–4, however other shaped tanks such as 'D' shaped tanks, may also be installed under this invention with variations in the shapes of the tank brackets 20 and tank straps 40. Separate from the main vehicle assembly line, the fuel tank 11; the tank brackets 20 and the tank straps 40 are combined as follows. Each tank bracket 20 is semi-circularly shaped piece formed with a mating surface 28 to mate with a portion of the outer radial surface of the fuel tank 11. Each tank bracket 20 has an upraised u-bend 23 or top hat shape when viewed cross sectionally. The u-bend 23 runs down the center of the entire length of the tank bracket 20. A strap bolt cowl 22 extends out from the U-bend 23 at one end of the tank bracket 20. Each tank bracket 20 has two alignment pins 21, symmetrically located near the end of the tank bracket 20 with the strap bolt cowl and each alignment pin 21 jutting out from each side of the U-bend 23. See FIGS. 1 and 6 in particular. The alignment pin 21 acts like a first mating component as described above in the summary section above. Additionally, each tank bracket 20 has lower strap bolt holes 24 through the U-bend 23 near the end of the tank bracket 20 opposite the end with the strap bolt cowl 22. Additionally, bracket to bracket inner bolt holes 25 exist through the u-bend 23. See FIGS. 5 and 6. Each tank strap 40 is a flexible piece made preferably of a strong steel and has a means for attaching an upper strap bolt 45 to one end of the tank strap 40. The upper strap bolt 45 is parallel to the length of the tank strap 40. The opposite end of the tank strap 40 from the end with the upper strap bolt 45 has a means for attaching a lower strap bolt 46. The tank straps 40 are of a length such that when combined with the tank brackets 40 around the fuel tank 11, the result is a tight fit around the outer diameter of the fuel tank 11. See FIGS. 1–4.

Separate from the main vehicle assembly line, the fuel tank 11 is lined up in contact with the mating surfaces 28 of one of the tank brackets 20. One of the tank straps 40 is wrapped around the fuel tank 11, with the lower strap bolt 46 attaching the lower end of the tank strap 40 to the lower strap bolt hole 24 of the tank bracket 20 and the upper strap bolt 45 passing through a hole in the bolt cowl 22 of the tank bracket 20. Nuts are fastened to the upper strap bolt 45 and the lower strap bolt 46 to tightly bind the combination of the tank bracket 20 and the tank strap 40 to the outer diameter of the fuel tank 11. The above process is repeated for each tank bracket 20 and tank strap 40 pair to be installed.

Should entry/egress steps be desired, upper step brackets 43 and lower step brackets 44 are screwed into the outer face of the tank straps 40 in the desired positions. The upper step 41 and lower step 42 are then affixed to the upper step brackets 43 and lower step brackets 44 respectively. See FIG. 1–4.

It should be noted that the above described assembly away from the main vehicle assembly line allows for alignment of items on and to the fuel tank 11 such as placement of a fuel filling cap for the fuel tank 11 and tank name plates. This alignment of the fuel tank 11 can be performed without impeding the progress on the main assembly line.

The rail brackets 30 have at least three sides when viewed from the side and are u-shaped when viewed from the top and bottom. The rail brackets shown in FIGS. 1, 2 and 8 have 4 sides when viewed from the side. Each rail bracket 30 has a front face 37 and a rear face 38. See FIGS. 1, 2, 8 and 9. The front faces 37 and rear faces 38 of the rail brackets 30 have top sides 36 each with an alignment notch 32 and sides shaped to conform with the semi-circular shape of the tank bracket 20. The alignment notches 32 act as second mating components combined with the alignment pins 21 of the tank brackets 20 as first mating components to comprise an initial alignment means as described above in the summary section. When viewed from the top, the rail brackets 30 have an inner width slightly wider than the outer width of the u-bend 23 of the tank bracket 20. Each rail bracket 30 has two fixed nuts 33 attached to the front face 37 and two bracket-to-bracket outer bolt holes 35 in each of the front face 37 and rear face 38 corresponding to the bracket-to-bracket inner bolt holes 25 on the tank bracket 20. The rail brackets 30 are bolted to the frame rail 12 of the vehicle 101 via rail bolts 31 through rail bracket-to-frame holes 34 in the rail bracket 30. This installation of the rail brackets 30 to the frame rail 12 can occur while the vehicle 101 is on the main assembly line.

Once the fuel tank 11, tank brackets 20, tank straps 40, upper step 41 and lower step 43 are combined (referred to as the fuel tank 11 and attachments from here on in) and the rail brackets 30 are installed on the frame rail 12, the fuel tank 11 with attachments is brought to the main assembly line and raised up to the rail brackets 30. The alignment pins 21 on the tank brackets 20 fit into the alignment notches 32 on the rail brackets 30. The fuel tank 11 and attachments may be released with the fuel tank 11 and attachments pivoting down and inwards due to the force of gravity. The u-bends 23 of the tank brackets 20 slip into the gap between the front faces 37 and the rear faces 38 of the rail brackets 30. The rail brackets 30 will support the fuel tank 11 and attachments via the alignment notches 32. The tank brackets 20 may be finally attached to the rail brackets 30 via bolts 29 (not shown) through the bracket-to-bracket outer bolt holes 35 and the bracket-to-bracket inner bolt holes 25 to the fixed nuts 33 of the rail brackets 30. A packing insert 27 (not shown) may be inserted into the inner portion of the u-bend 23 of the tank bracket 20 for added stability. Where the packing insert 27 is used, the bolts 29 will pass through holes in the packing insert 27 in addition to the above described components.

Figure 12:
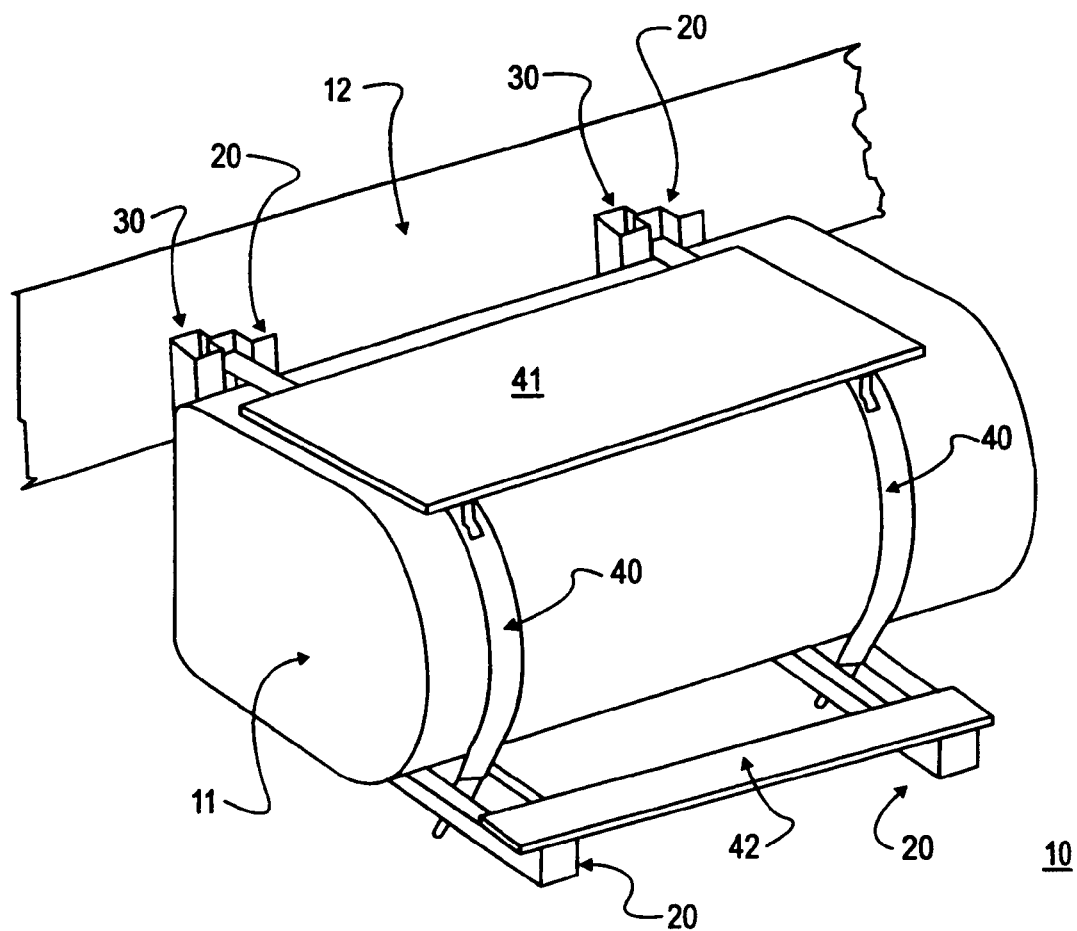
FIG. 12 is a perspective view of the fuel tank assembly of the present invention installed to a frame rail of a vehicle using a 'D' shaped tank.

As mentioned earlier the bracket-to-bracket attachment method with an initial alignment means may be used for attaching other components in a pre-assembled form. One component mentioned earlier is the installation of a 'D' shaped tank assembly. The main variation from the above described cylindrical tank version of the invention is that the tank bracket 20 would be 'L' shaped to accommodate the bottom and one side of the 'D' shaped tank and the tank strap 40 would be bent accordingly to encircle the 'D' shape when combined with the tank bracket 20. The lower portion of the tank strap 40 would not necessarily be engaged to an end of the tank bracket 20 as a lower portion of the tank bracket 20 could extend out from underneath the tank 11 with the lower portion of the tank strap 40 attached to the tank bracket 20 just short of an end of the tank bracket 20. See FIG. 12. The extension of tank bracket 20 would remove the need for the lower step brackets 44 as the lower step 42 would be attached to the extended portion of the tank brackets 20. The initial alignment means for the 'D' shaped tank would be the same as the cylindrical tank, that being by alignment pins 21 on the tank bracket lining up with alignment notches 32 on the rail brackets.

Another component assembly attached to a vehicle with the bracket-to-bracket attachment through an initial alignment means is a vehicle battery box. The initial alignment means for a battery box is different in that instead of an alignment pin and notch arrangement, a tab(s) which turns downwards and extends out from the back of the bracket on the battery box. Following installation of this box bracket on the battery box, the battery box is moved up to the rail bracket mounted on the vehicle with the tab(s) fitting into a slot(s) on the rail bracket. The tab(s) allows for little or no alignment effort. With the battery box temporarily held to the vehicle via the tab and slot initial alignment means, final attachment of the box bracket to the rail bracket is made and hence final attachment of the battery box to the vehicle. A pair of outer brackets on the side of the battery box would accommodate entry/egress stairs to the vehicle. Another component to be installed with this methodology is a combination battery box and vehicle air tank assembly. The battery box would be installed to the vehicle as described above with the vehicle air tanks mounted to the underside of the battery box at the same time the component brackets are installed on the battery box performed off of the vehicle main assembly line. An additional version of the invention would be a step access platform installed with the methodology of this invention.

An additional embodiment of a battery box assembly for engagement to a frame rail 12 of the vehicle 101 is shown in FIGS. 13 to 25. There are rail brackets 230 and 231 which would be engaged to the frame rail 12. There is a first mating component on a forward and a first mating component on a rear side of a battery box which would be engaged to a second mating component on each of the rail brackets 230 and 231. The rail brackets 230 and 231 are approximately mirror images of each other, one being for a forward engagement to the battery box and one for a rearward engagement to the battery box. Each of the first mating components is comprised of a first alignment pin 221 jutting out horizontally from an outer surface of the battery box. Each of the second mating components is comprised of a first alignment notch 232 on a top side of the rail brackets 230 and 231; the first alignment notches 232 are sized to receive the first alignment pins 221 of the battery box. There may additionally be a second alignment pin 225 jutting out horizontally from each side of the battery box at a lower vertical location from the first alignment pin 221. Where there are second alignment pins 225 on the battery box, there will be a second alignment notch 232*a* on an approximately outward facing vertical surface of each of the rail brackets 230 and 231. The second alignment notches 232*a* are sized to receive the second alignment pins 225 of the battery box.

Figure 13:
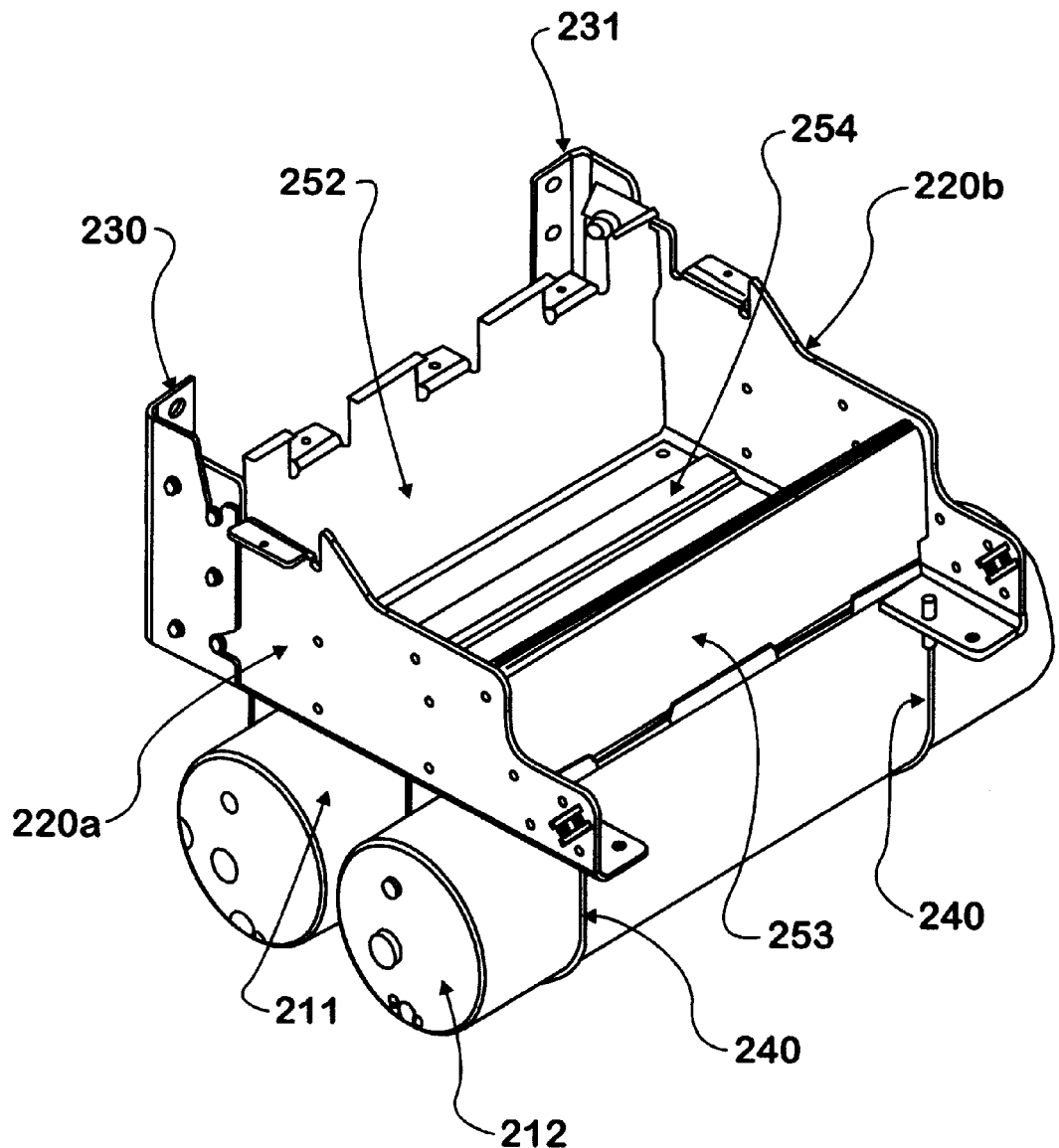
FIG. 13 is perspective view of a battery box and air tank assembly made in accordance with this invention.
Figure 14:
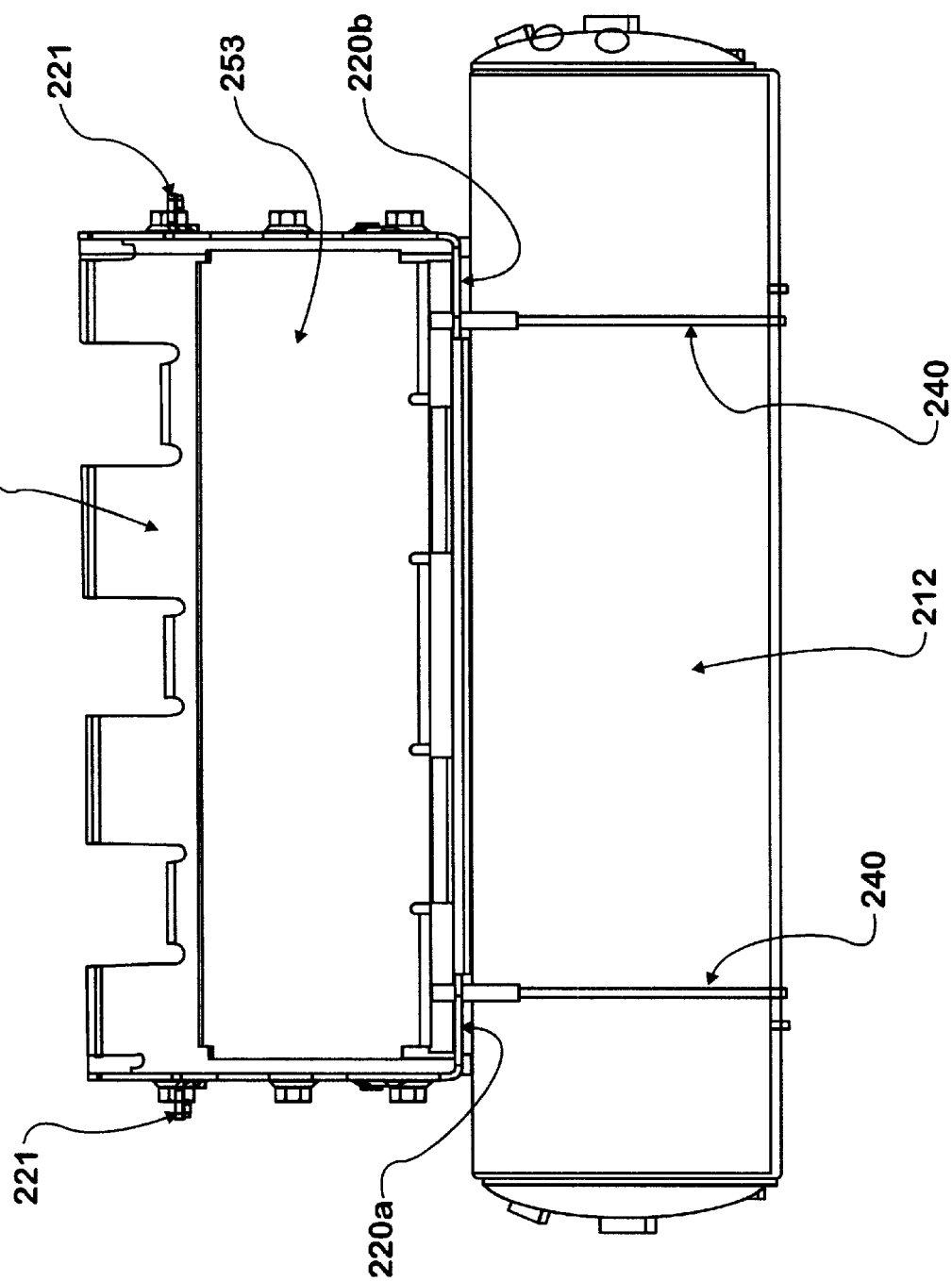
FIG. 14 is a front view of the assembly of FIG. 13.
Figure 15:
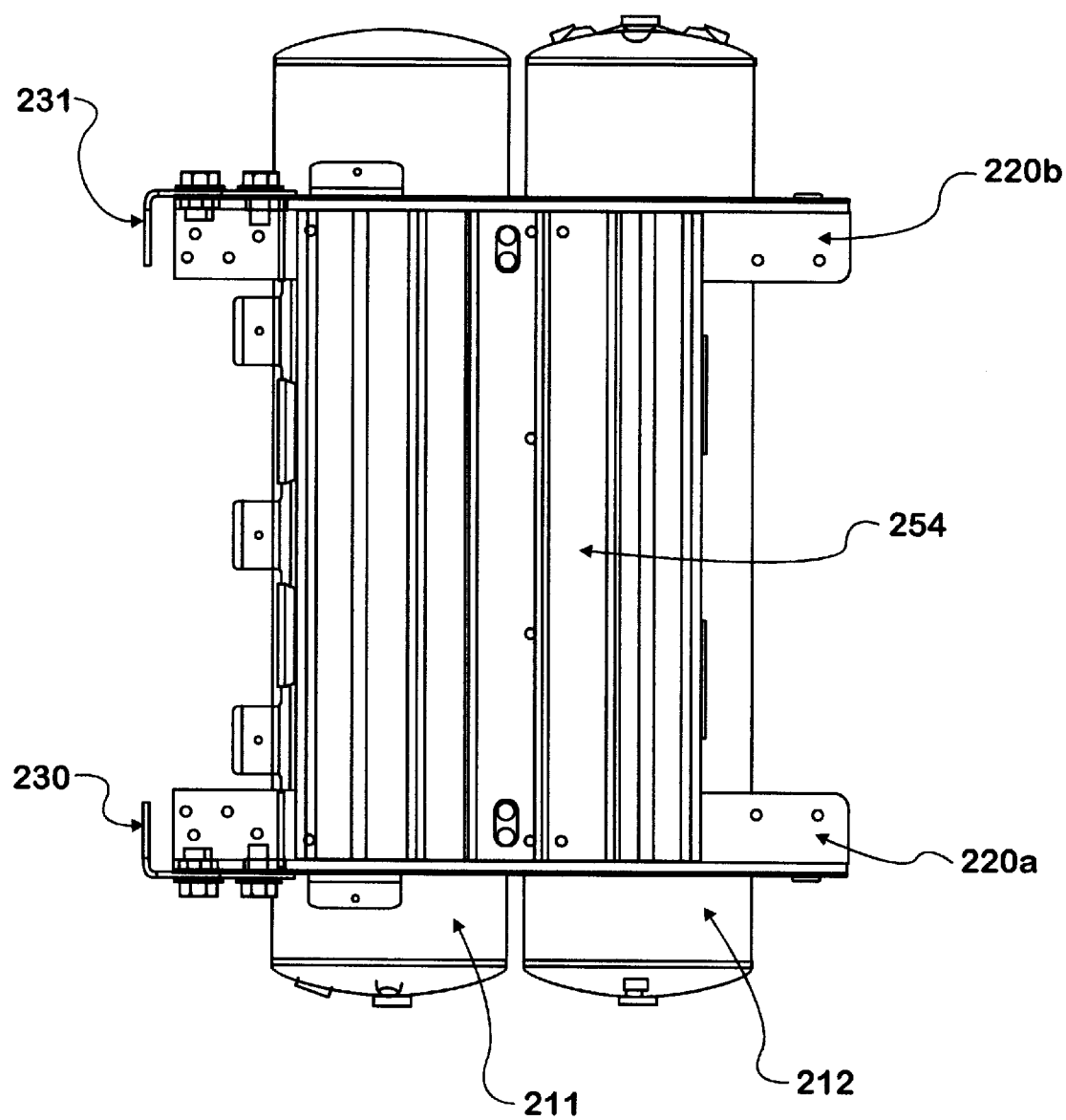
FIG. 15 is a top view of the assembly of FIG. 13.
Figure 16:
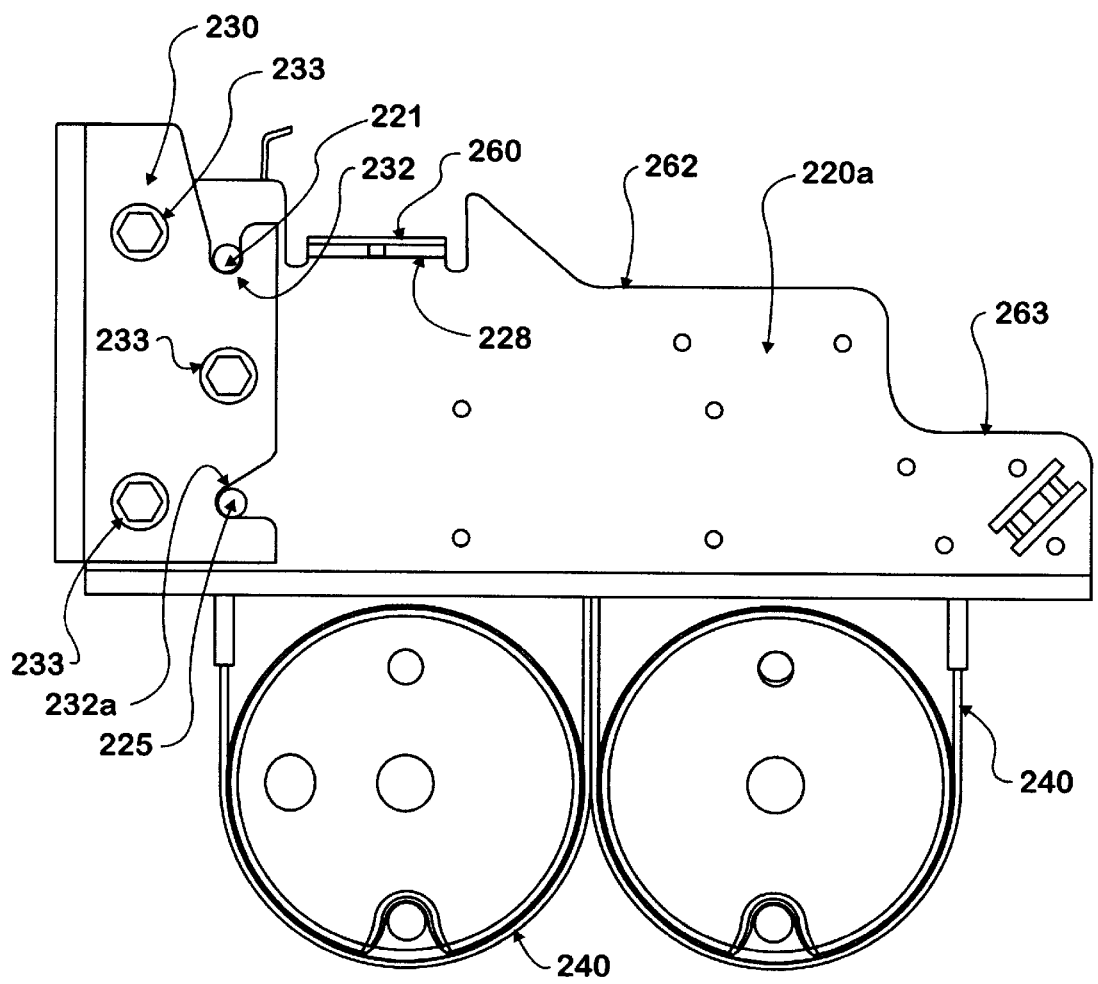
FIG. 16 is a left side view of the assembly of FIG. 13.
Figure 17:
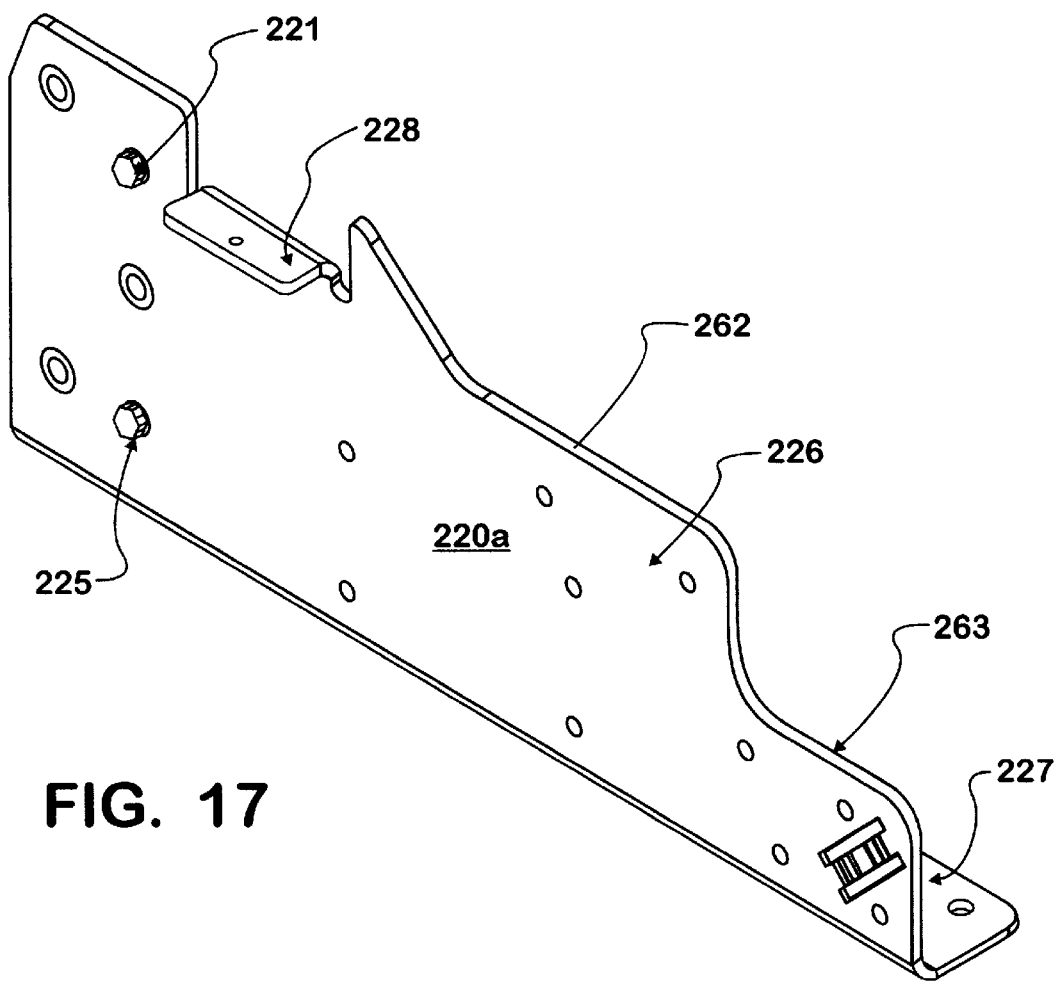
FIG. 17 is a perspective view of a combination structural rib and box bracket of the assembly of FIG. 13.
Figure 18:
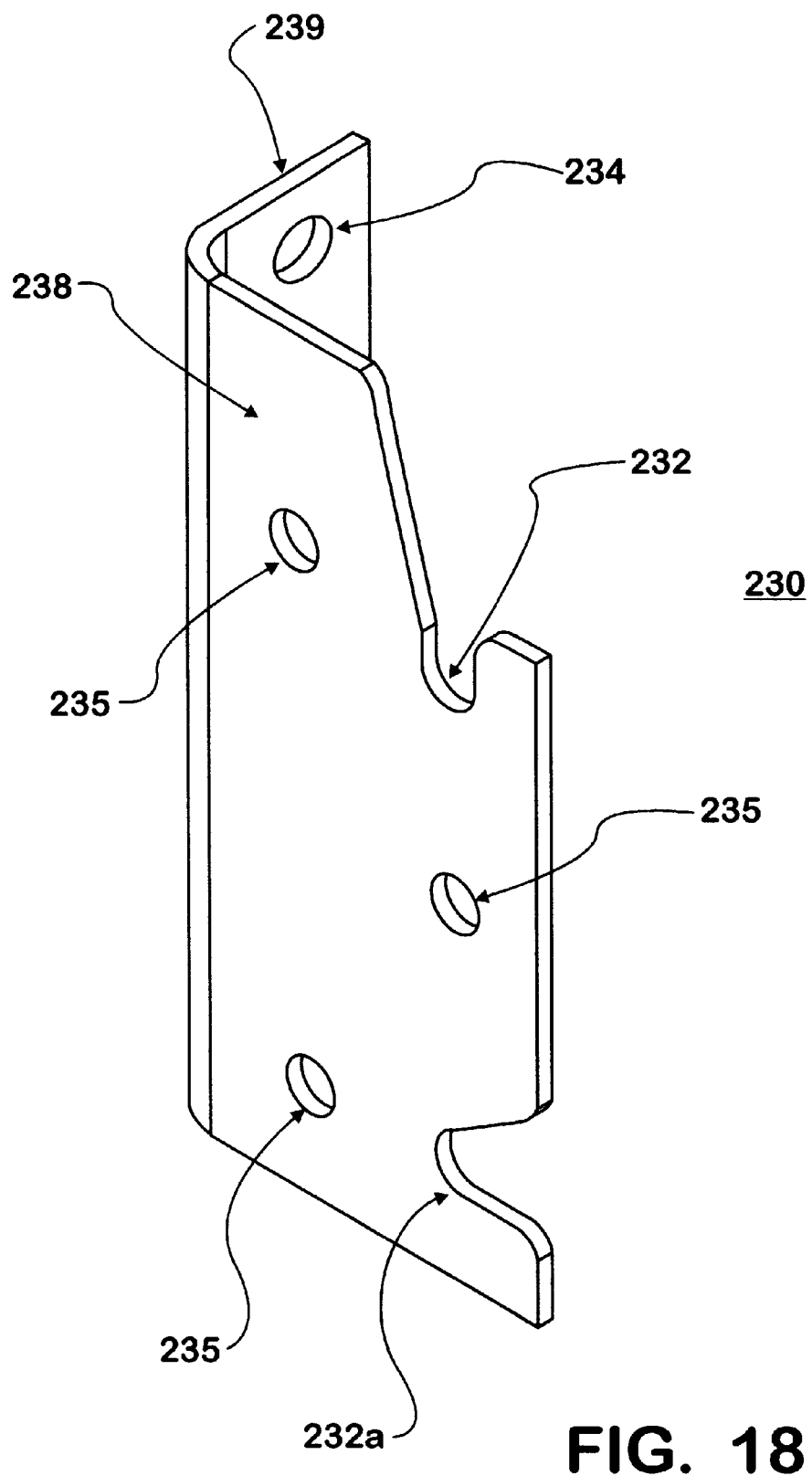
FIG. 18 is a perspective view of a rail bracket of the assembly of FIG. 13.

To install the battery box assembly of FIG. 13, workers attach the two rail brackets 230 and 231 to the frame rail 12 of the vehicle 101. The battery box is raised to a position adjacent to the rail brackets 230 and 231. The workers tilt the battery box to a slightly upturned angle with the battery box area containing the first alignment pins 221 and the second alignment pins 225 lower than the remainder of the battery box assembly. The battery box is raised and moved while maintaining the tilted angle until the first alignment pins 221 are above the first alignment notches 232. The workers lower the battery box while maintaining the titled angle until the first alignment pins 221 rest within the first alignment notches 232. The raised portion of the battery box assembly is lowered to a horizontal position with the second alignment pins 225 engaging within the second alignment notches 232*a* as the battery box rotates about the first alignment pins 221. Finally, the workers permanently attach each side of the battery box assembly to one of said rail brackets 230 and 231 via a permanent attachment means. The permanent attachment means may be a bolt and nut through holes in battery box assembly and the rail brackets 230 and 231.

The battery box assembly or otherwise referred to here as the battery box may be of various configurations. One embodiment of the battery box may be comprised of two combination structural rib and box brackets 220*a* and 220*b*, a battery tray 254, a front face 253, and a back face 252. The battery tray 254 is engaged between and supported by the combination structural rib and box brackets 220*a* and 220*b*. The combination structural rib and box brackets 220*a* and 220*b* are mirror images of each other with the combination structural rib and box bracket 220*a* being engaged to a more forward portion of the frame rail 12 of the vehicle 101 and the the combination structural rib and box bracket 220*b* rearward on the frame rail 12 relative the front of the vehicle 101. The front face 253 is engaged to a front edge of the battery tray 254 and between the combination structural rib and box brackets 220*a* and 220*b*. The back face 252 is engaged to a rear edge of the battery tray 254 and between the combination structural rib and box brackets 220*a* and 220*b*. The first mating components of each of the sets of mating components may be installed on the combination structural rib and box brackets 220*a* and 220*b*. As shown in the Figures, the first mating components could include the first alignment pins 221 and the second alignment pins 225. The alignment pins may be comprised of an end of a bolt which is engaged to a hole in the combination structural rib and box brackets 220*a* and 220*b* with nuts.

There may be a vehicle air system air tank engaged to and supported by the battery box. In the battery box assembly shown in FIGS. 13 to 16 there are two air tanks, a first air tank 211 and a second air tank 212. Depending on size constraints there may be only one air tank or more than two. The battery box supports the air tanks 211 and 212 and not vice versa. In the embodiment shown. the combination structural rib and box brackets 220*a* and 220*b* are the battery box components to which the air tanks 211 and 212 are engaged. In this embodiment, the air tanks 211 and 212 are engaged to undersurfaces of the combination structural rib and box brackets 220*a* and 220*b*. The embodiment shown has the air tanks 211 and 212 supported by heavy gauge wire 240 which are helded by conventional fasteners to the the combination structural rib and box brackets 220*a* and 220*b*. Other supporting components may be envisioned so long as sufficiently strong to hold the air tanks 211 and 212 to a structural member of the battery box. In the embodiment shown in FIGS. 13 to 16, the combination structural rib and box brackets 220*a* and 220*b* are parallel to each other and perpendicular to the frame rail 12 when the assembly is installed on the vehicle. The air tanks 211 and 212 being installed perpendicular to the combination structural rib and box brackets 220*a* and 220*b* are then in parallel to the frame rail 12.

The combination structural rib and box brackets 220*a* and 220*b* may be more particularly configured as follows. There may be an essentially vertical face 226 engaged approximately at a right angle to an essentially horizontal face 227. The horizontal faces 227 of the combination structural rib and box brackets 220*a* and 220*b* face inwards towards each other. The battery tray 254 is engaged to and supported by the horizontal faces 227 of the combination structural rib and box brackets 220*a* and 220*b*. An upper edge 262 of each of the combination structural rib and box brackets 220*a* and 220*b* may be a mounting surface for a cover of the battery box. Each upper edge 262 of the combination structural rib and box brackets 220a and 220b may have a horizontal step mounting surface 263 on an outward portion relative to the frame rails 12 when the battery box assembly is installed on the vehicle 101. One of the upper edges 262 of the combination structural rib and box brackets 220a and 220b has a horizontal battery cable tab 228. The horizontal tab 228 in combination with a dip in the upper edge provides a battery cable passageway 260 to allow routing of cables engaged to batteries contained in the battery box externally to an electric system of the vehicle 101.

The combination structural rib and box brackets 220a and 220b may be comprised of two separate pieces engaged to each other. The pieces in this case would be comprised of a first piece which is engaged to the battery tray 254 and a second piece attached to the first piece which contains said first mating components.

Each of the rail brackets 230 and 231 have a frame rail mounting face 239 engaged approximately at a right angle to a battery box engagement face 238. Each of the battery box engagement faces 238 contain the second mating components. These second mating components may be first alignment notches 232 on top sides of the battery box engagement faces 238. The battery box engagement faces 238 may have the second alignment notches 232a on outward facing vertical surfaces. The battery box engagement faces 238 may also contain holes 235 for the permanent engagement means. where the permanent engagement means between the rail brackets 230 and 231 and the combination structural rib and box brackets 220a and 220b are conventional fasteners 233.

As described above the fuel tank assembly 10 and method of installing same of the present invention provide a number of advantages, some of which have been described above, and others of which are inherent in the invention. Also, modifications may be proposed to the fuel tank assembly 10 and method without departing from the teachings herein. Accordingly, the scope of the invention is only to be limited as necessitated by the accompanying claims.

What is claimed is:

1. A battery box assembly for installation on a mobile vehicle with a frame rail, comprising:
   (a) a battery box comprising two combination structural rib and box brackets, a battery tray engaged between and supported by said combination structural rib and box brackets, a front face engaged to a front edge of said battery tray and between said combination structural rib and box brackets, and a back face engaged to a rear edge of said battery tray and between said combination structural rib and box brackets;
   (b) two rail brackets for attachment to the frame rail of the vehicle;
   (c) an initial alignment means comprised of two sets of mating components, a first mating component of each of said sets of mating components installed on each of said combination structural rib and box brackets and a second mating component of each of said sets of mating components installed on each of said rail brackets;
   (d) each of said combination structural rib and box brackets for attachment to one of said rail brackets via an attachment between said first mating components and said second mating components;
   (e) each of said first mating components is comprised of a first alignment pin jutting out horizontally from an outer surface of each of said combination structural rib and box brackets;
   (f) each of said rail brackets has at least two sides in a top view, each of said rail brackets having a top side;
   (g) each of said second mating components is comprised of a first alignment notch on said top side of said rail bracket, said first alignment notches sized to receive said first alignment pins of said combination structural rib and box brackets;
   (h) a permanent attachment means between each of said combination structural rib and box brackets and one of said rail brackets;
   (i) said first mating surface components further comprised of a second alignment pin jutting out horizontally from each said combination structural rib and box brackets at a lower vertical location from said first alignment pin;
   (j) said second mating components further comprised of a second alignment notch on an approximately outward facing vertical surface of each of said rail brackets;
   (k) said second alignment notches sized to receive said second alignment pins of said combination structural rib and box brackets; and
   (l) each of said first alignment pins is disposed adjacent an inboard end of said battery box assembly and a center of gravity of said battery box assembly is disposed between said first alignment pins and an outboard end of said battery box assembly such that, when said first alignment pins are disposed within said first alignment notches, gravitational forces acting on said battery box assembly urge said first alignment pins vertically downwardly into said first alignment notches and also cause a moment about said first alignment pins that causes said second alignment pins to be urged horizontally into said second alignment notches.

2. The battery box assembly of claim 1, further comprising:
   (a) an air tank engaged to undersurfaces of and supported by said combination structural rib and box brackets.

3. The battery box assembly of claim 2, wherein:
   (a) said air tank is engaged to said undersurfaces of said combination structural rib and box brackets by heavy gauge wire.

4. The battery box assembly of claim 3, wherein:
   (a) said rail brackets when installed on the frame rail of the vehicle cause said combination structural rib and box brackets to be directed perpendicular to the frame rail; and
   (b) said air tank is engaged perpendicular to said combination structural rib and box brackets.

5. The battery box assembly of claim 1, wherein:
   (a) said combination structural rib and box brackets have an essentially vertical face engaged approximately at a right angle to an essentially horizontal face;
   (b) said horizontal faces of said combination structural rib and box brackets facing inwards towards each other; and
   (c) battery tray engaged to said horizontal faces of said combination structural rib and box brackets.

6. The battery box assembly of claim 5, wherein:
   (a) an upper edge of each of said combination structural rib and box brackets is a mounting surface for a cover of said battery box; and
   (b) each said upper edge of said combination structural rib and box brackets has a horizontal step mounting surface on an outward portion relative to the frame rails when the battery box assembly is installed on the vehicle.

7. The battery box assembly of claim 6, wherein:

(a) one of said upper edges of said combination structural rib and box brackets has a horizontal battery cable tab; and (b) said horizontal tab in combination with a dip in said upper edge provides a battery cable passageway to allow routing of cables engaged to batteries in said battery box externally to an electric system of the vehicle.

8. The battery box assembly of claim 1, wherein:

(a) each of said rail brackets have a frame rail mounting face engaged approximately at a right angle to a battery box engagement face;

(b) each of said battery box engagement faces have said first alignment notches on said top sides of said rail brackets; and (c) said battery box engagement faces have said second alignment notches on said outward facing vertical surfaces.

9. The battery box assembly of claim 8, wherein:

(a) said first alignment pins and said second alignment pins are bolts which are engaged to said combination structural rib and box brackets with nuts and face outwards relative to said combination structural rib and box brackets.

10. The battery box assembly of claim 1, wherein:

(a) said combination structural rib and box brackets are comprised of two separate pieces engaged to each other, said pieces comprised of a first piece which is engaged to the battery tray and a second piece attached to said first piece which contains said first mating components.

11. The battery box assembly of claim 1, wherein:

(a) said permanent attachment means between said combination structural rib and box brackets and said rail brackets comprised of a bolt and nut through holes in between said combination structural rib and box brackets and said rail brackets.

12. A method for installing a battery box assembly on a mobile vehicle with a frame rail, comprising the steps of:

(a) attaching two rail brackets to the frame rail of the vehicle, each of the rail brackets having a first alignment notch on a top side of the rail bracket and a second alignment notch on an approximately outward facing vertical surface;

(b) raising the battery box assembly to a position adjacent to the rail brackets the battery box assembly having a first alignment pin jutting out horizontally from an outer surface on each side of the battery box assembly adjacent an inboard side of the battery box assembly, a center of gravity of the battery box assembly being disposed between the first alignment pins and an outboard side of the battery box assembly, the first alignment pin sized to fit within the first alignment notch, the battery box assembly having a second alignment pin jutting out horizontally from each side of the battery box assembly at a lower vertical location from said first alignment pin, the second alignment pin sized to fit within the second alignment notch;

(c) tilting the battery box to a slightly upturned angle with the side area containing first alignment pins and the second alignment pins are lower than the remainder of the battery box assembly;

(d) raising and moving the battery box while maintaining the tilted angle until the first alignment pins are above the first alignment notches;

(e) lowering the battery box while maintaining the titled angle until the first alignment pins rest within the first alignment notches;

(f) lowering the raised portion of the battery box assembly rotate to a generally horizontal position with the second alignment pins engaging within the second alignment notches; and (g) attaching each side of the battery box assembly to one of said rail brackets via a permanent attachment means.

13. A battery box assembly for installation on a mobile vehicle with a frame rail, comprising:

(a) a battery box with a forward side and a rear side;

(b) two rail brackets for attachment to the frame rail of the vehicle;

(c) an initial alignment means comprised of two sets of mating components, a first mating component of each of said sets of mating components installed on each of said forward side and rear side and a second mating component of each of said sets of mating components installed on each of said rail brackets;

(d) said forward side and rear side of said battery box for attachment to one of said rail brackets via an attachment between said first mating components and said second mating components;

(e) each of said first mating components is comprised of a first alignment pin jutting out horizontally from an outer surface said forward side and rear side of said battery box;

(f) each of said rail brackets has at least two sides in a top view, each of said rail brackets having a top side;

(g) each of said second mating components is comprised of a first alignment notch on said top side of said rail bracket, said first alignment notches sized to receive said first alignment pins of said forward side and rear side of said battery box;

(h) a permanent attachment means between each of said forward side and rear side of said battery box and one of said rail brackets;

(i) said first mating surface components further comprised of a second alignment pin jutting out horizontally from each said forward side and rear side of said battery box at a lower vertical location from said first alignment pin;

(j) said second mating components further comprised of a second alignment notch on an approximately outward facing vertical surface of each of said rail brackets;

(k) said second alignment notches sized to receive said second alignment pins of said forward side and rear side of said battery box; and (l) each of said first alignment pins is disposed adjacent an inboard end of said battery box assembly and a center of gravity of said battery box assembly is disposed between said first alignment pins and an outboard end of said battery box assembly such that, when said first alignment pins are disposed within said first alignment notches, gravitational forces acting on said battery box assembly urge said first alignment pins vertically downwardly into said first alignment notches and also cause a moment about said first alignment pins that causes said second alignment pins to be urged horizontally into said second alignment notches.

14. The battery box assembly of claim 13, further comprising:
(a) an air tank engaged to undersurfaces of and supported by said battery box.

15. The battery box assembly of claim 14, wherein:
(a) said air tank is engaged to said undersurfaces of battery box by heavy gauge wire.

* * * * *